United States Patent
Mellgren

[15] 3,659,635
[45] May 2, 1972

[54] APPARATUS FOR FELLING AND BUNDLING TREES

[72] Inventor: Per Gustaf Mellgren, Soderhamn, Sweden

[73] Assignee: Kockum Soderhamn Aktiebolag, Soderhamn, Sweden

[22] Filed: Apr. 24, 1970

[21] Appl. No.: 31,493

[30] Foreign Application Priority Data

Apr. 24, 1969 Sweden..................5843/69

[52] U.S. Cl............................143/43 N, 144/3 D
[51] Int. Cl...........................................A01g 23/02
[58] Field of Search..............143/32 N, 43 N, 141; 144/2 Z, 144/3 D, 34 R, 34 A, 309 AC

[56] References Cited

UNITED STATES PATENTS

| | | | |
|---|---|---|---|
| 1,319,058 | 10/1919 | Fitzpatrick | 144/34 A |
| 1,414,319 | 8/1922 | Zaiauskis | 143/43 N |
| 2,603,249 | 7/1952 | Lawrence | 143/43 N |
| 2,662,561 | 12/1953 | Duncan | 143/43 N |
| 2,664,119 | 12/1953 | Spearman | 144/34 A |
| 2,882,941 | 4/1959 | Pope | 144/3 D |
| 3,343,575 | 9/1967 | Trout | 144/34 R |
| 3,372,719 | 3/1968 | Shone | 143/141 |
| 3,498,347 | 3/1970 | Vit | 144/3 D |
| 3,528,468 | 9/1970 | Blonsky | 144/309 AC |

FOREIGN PATENTS OR APPLICATIONS 119,034   1959   U.S.S.R..................144/3 D

*Primary Examiner*—Gerald A. Dost
*Attorney*—Fred C. Philpitt

[57] ABSTRACT

A feller buncher apparatus including in combination a cutter device, an elongated collected trough for severed trees, means to support the weight of a tree, and means to apply a force against the lower end of a severed tree so that it will topple into said elongated collecting trough.

8 Claims, 5 Drawing Figures

Patented May 2, 1972 3,659,635

Patented May 2, 1972 3,659,635

APPARATUS FOR FELLING AND BUNDLING TREES

Known machines for felling and bundling trees, hereinafter defined as feller-bundlers, are designed so that the machine must be at standstill during the time required for cutting and felling the tree and positioning of the felled tree on a holding or collecting device. In order to perform said steps the operator of the machine or special assisting staff must generally carry out a plurality of coordinating operations by manipulating control devices of the machine, which is tiring for the staff and results in low production per unit of time. Further, prior art machines are of a relatively complicated construction.

The object of the present invention is to produce a feller-bundler of a relatively simple construction, which allows felling and bundling trees without the need of stopping the machine for each tree to be cut, i.e. the machine can be moved forward continuously during all the steps indicated for cutting, felling and bundling the trees. In other words, the machine according to the present invention is arranged to be used substantially in the same manner as a conventional harvesting machine in the form of a harvesting thresher or mechanical binder and is intended to be driven in a corresponding manner along a substantially straight path over the area to be harvested. The time required for the cutting each tree will thereby be minimized, which means that the feller-bundler of the present invention can attain a high production per time unit.

A further object of the present invention is to produce a feller-bundler with which the number of operations to be performed by the operator of the machine during the felling of the trees is substantially reduced so that the operation of the machine will be as little tiring as possible, which further adds to an increase of the production capacity of the machine.

An apparatus according to the present invention of felling and bundling trees comprises a cross country engine driven vehicle and is mainly characterized by a cutting unit, arranged at one end of said vehicle and adapted to be raised and lowered, said cutting unit comprising a cutting disc with a bearing device and a driving device, said apparatus further being provided with a device for supporting the tree immediately after the tree has been cut so that the cutting disc is substantially released from the weight of the tree.

According to the present invention the device for supporting the tree is mounted on the cutting unit and comprises an abutment or a fence with spikes or the like extending in the direction of forward movement of the apparatus so as to engage and support the tree, said device further being arranged so that it is reciprocable in the direction of movement of the apparatus and spring loaded in such a manner that during the cutting step it is retracted relative the direction of movement of the apparatus against the spring loading, which is arranged so that after cutting the tree the latter is swung forwardly at its root end, whereby due to the inertia of the rest of the tree, the tree is caused to fall backwards relative to the direction of movement of the apparatus.

For the collection of the trees thus felled the apparatus according to the invention comprises a load platform or similar collecting device, which is located high up on the vehicle and arranged with a certain inclination downwards in the direction of movement or the direction of length of the apparatus and has its forward end portion adjacent and slightly above the cutting unit.

Further, according to the present invention the end portion of the load platform adjacent the cutting unit may be provided with a U-shaped forwardly open space accomodating the tree during the cutting step whereby the tree is guided laterally during the felling operation. Alternatively, or in addition, separate guide arms may be provided for action on the cut tree so that it does not fall forwards or sideways but is guided to a proper position on the load platform.

According to the present invention a cutting disc of a sturdy design is used, e.g. with a thickness of 10 to 30 mm, said disc preferably being provided with replaceable, strong cutting edges, preferably of hard metal or the like, which to a certain extent can endure rough treatment, e.g. inadvertent engagement with rock, gravel or the like. In order to allow continuous movement of the vehicle even during the cutting step the cutting disc must be driven by a powerful motor and with a rotational speed corresponding to a peripheral velocity of 25 to 100 m/s.

The invention will hereinafter be more fully described with reference to the accompanying drawings, which, mainly schematically, show one embodiment of the feller-bundler according to the invention.

Figure 1:
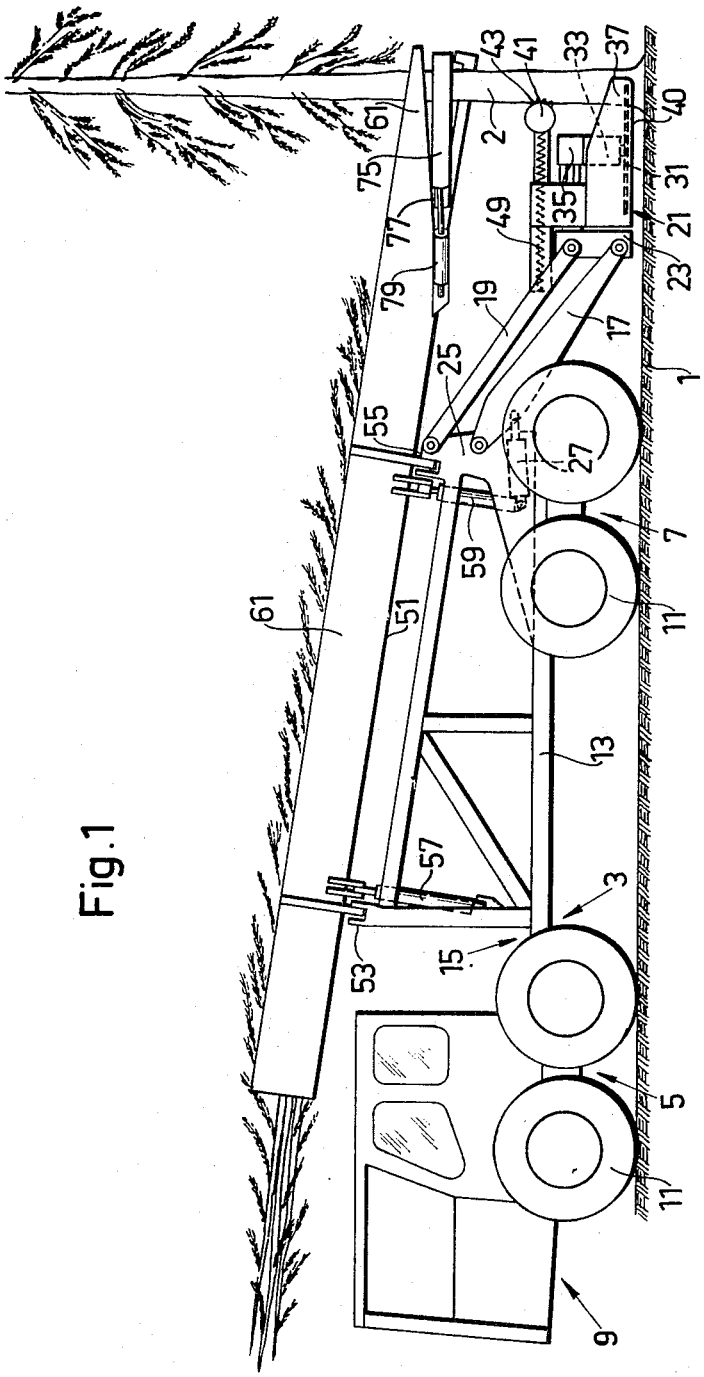
FIGS. 1, 2 and 3 show the feller-bundler from the side, from the top and from the rear, respectively.

In FIG. 1 the reference numeral 1 indicates the soil surface on which the feller-bundler is to be moved continuously during the cutting of trees 2. The feller-bundler is built on a forest tractor 3, which can be of standard type and comprise a front section 5 and a rear section 7. The front section is provided with a unit 9 containing the engine of the vehicle, and a driver's cab. The unit 9 is supported by two drive wheels 11 arranged in tandem (boggie). The rear section comprises a frame 13, which is similarly supported by two supporting wheels 11 arranged in tandem . All supporting wheels can be driven. The rear section 7 can be pivotably coupled to the front section 5 by means of a coupling device 15.

According to the invention a cutting unit 21 is mounted at the frame 13 of the feller-bundler by means of two pairs of parallel arms 17 and 19, which are of substantially equal length and articulately connected on one hand to the frame at its rear end and on the other hand to the frame 23 of the cutting unit 21. The joints, by which the parallel arm 19 is connected to the frame 13 and the frame 23 of the cutting unit, are spaced in a suitable manner substantially in a vertical direction from the corresponding joints through which the parallel arm 17 is connected with the frame 13 and the frame 23, respectively. The arms 17 and 19 are arranged to be pivoted upwards and. downwards by means of a hydraulic motor 27, which is inserted between the frame 13 and the arm 17. As mentioned above, and shown on the drawing, the cutting unit, when pivoted upwards and downwards in such a manner by the arms 17 and 19, will not be subjected to any rotational movement relative to a horizontal axis, which is perpendicular to the direction of movement of the feller-bundler. The cutting unit 21 comprises a sturdy cutting disc 31, which is supported by a bearing 33 secured to the frame 23 of the cutting unit and driven by a motor 35, which can be a hydraulic or electric motor. As a protection for the cutting disc 31, the are protected horns 37 and 39, which preferably are secured to the frame 23, the lower edge 40 of said horns extending slightly beneath the cutting disc 31, so that the cutting disc is protected against direct contact with the soil or obstacles thereon, e.g. stones, which might damage the cutting disc.

At a short distance over the cutting disc 31 there is a fence 41 with spikes 43 directed towards the trees 2, said fence extending mainly horizontally and perpendicularly to the dirving direction of the feller-bundler and being supported by two arms 45, which are movable in guides 47, secured to the frame 23 of the cutting unit, the arms and the guides extending in the direction of the feller-bundler. Powerful compression springs 49, extending within the guides 47 and if desired, within the arms 45, are arranged to maintain the abutment or fence 41 in abutment with the tree during the cutting operation.

Figure 3:
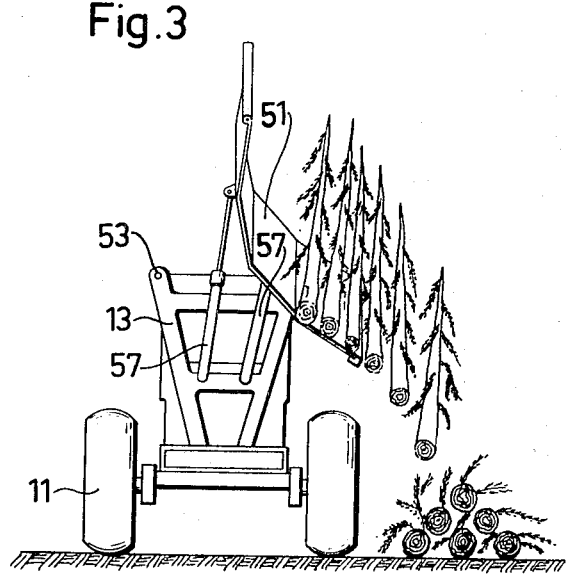

At the upper part of the frame a load platform is provided on supports 53 and 55 at the front and rear end of the frame, respectively. The load platform comprises two upwardly inclined side elements 61 and 63 as well as a bottom 65, The whole load platform is inclined downwards in the direction forward of the feller-bundler at an angle of 5° to 10°. The load platform is adapted to be tilted in one direction or the other by means of two pairs of hydraulic motors 57 and 59 at the front and rear end, respectively, of the frame 13, as is best shown in FIG. 3.

The rear end portion of the load platform has a dovetail shape, since the side elements 61 and 63 present tapered portions 71 and 73, respectively, which extend rearwardly beyond the rear end of the bottom 65 of the load platform. The portions 71 and 73 of the side elements of the load platform also extend beyond the rear end of the cutting unit 21. At the portions 71 and 73 there are further felling arms 75, which are rotatably mounted around a vertical shaft 77, one such felling arm being arranged to be rotated by means of a hydraulic motor, 79, which is interposed between the arm and the platform 51.

Figure 2:
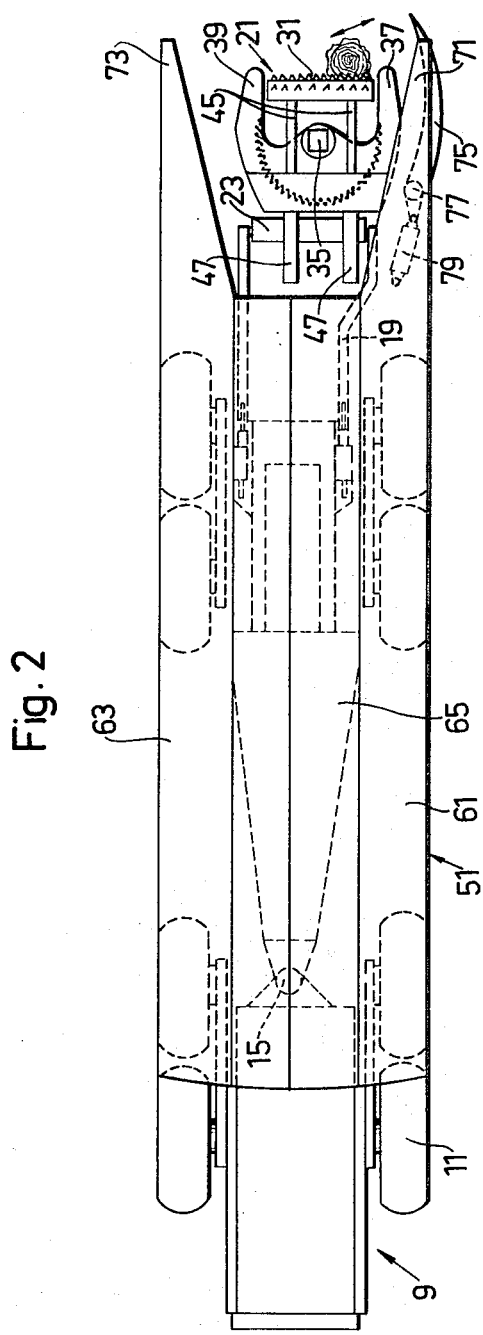

As shown in FIG. 2, the cutting unit is not located symmetrically relative to a vertical centre plane through the feller-bundler in the driving direction (the direction of movement of the vehicle) but is displaced laterally relative to this centre plane for reasons to be explained below.

Figure 4:
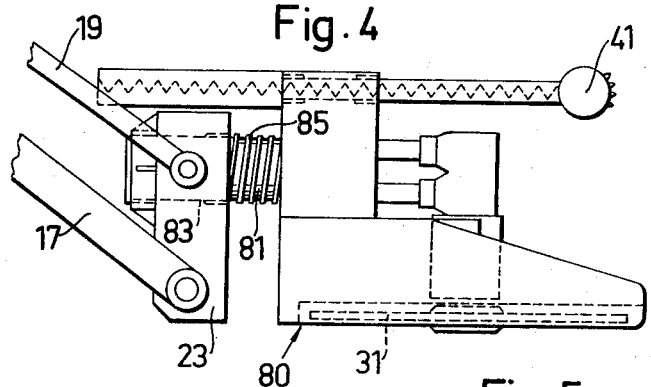
FIGS. 4 and 5 show a special embodiment of the cutting unit of the apparatus as seen from the side and from above, respectively.
Figure 5:
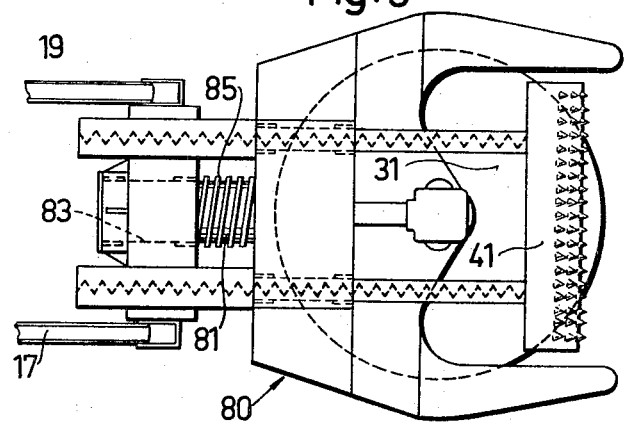

The bearing 33 of the cutting disc 31, the frame 23 of the cutting unit or the holder 25 of the frame 13, to which the parallel arms 17 and 19 are articulated, can preferable be arranged so that they allow a certain rotation of the cutting disc 31 around an axis, which is parallel to the direction of movement of the feller-bundler so as to prevent the cutting disc from being clamped in the cutting groove during possible rotational movement of the frame around an axis, which is parallel to the driving direction of the feller-bundler, e.g., when the vehicle is driven with the pair of wheels of only one side over a stump, a stone or the like. FIGS. 4 and 5 indicate how this can be accomplished. The aggregate 80 consisting of the cutting disc, its bearing and motor and the abutment 41 with its support is arranged on a shaft 81 which is turnable in a corresponding bore 83 in the frame 23 of the cutting unit. Between the aggregate 80 and the frame 23 is inserted a strong torsion spring 85, which, in its resting position, holds the aggregate 80 in a position such that the cutting disc is approximately horizontal. Thus the arrangement allows automatically a certain angular deviation in one or the other direction of the cutting disc, if such deviation should be required during the use of the apparatus.

Also, the construction according to FIGS. 4 and 5 can be used to give the cutting unit a certain shock absorbing ability in the direction of movement of the apparatus. In this case the shaft 81 is slideable in the bore 83 against the action of the spring 85. If desired, the shaft 81 may then also be held against rotation in the bore 83. The cutting disc is preferably provided with removable cutting edges of hard metal, which are easily replaceable and can stand accidental cutting in rock, stone, sand or the like.

The feller-bundler according to the invention is driven and operates in the following manner. The feller-bundler is driven along the boundary of the forest to be cut, e.g. clear cut. The cutting unit 21 is displaced laterally, as described above, the displacement being directed away from that side of the apparatus which is directed towards the forest to be cut. In this manner it is secured that the support wheels directed towards the forest to be cut are not hindered by un-felled trees.

The feller-bundler is adapted to be driven continuously in a similar manner as a harvesting thresher, the speed of the apparatus being within the range 20 to 100 m/minute. Thus, the cutting of the trees is performed, when the feller-bundler is driven at such a speed. To allow such operation the cutting disc should be arranged in a manner and driven with power that allows a feeding speed of the cutting disc within the range of 50 to 100 m/minute.

The peripheral velocity of the cutting disc under such circumstances should be between 25 and 100 m/s. By means of the parallel arms 17 and 19 the driver continually adjusts the desired height of the cutting disc over the soil surface. As soon as the cutting unit 21 is brought into contact with a tree 2 and the cutting is started, the abutment of fence 41 will be brought into engagement with the tree, the spikes 43 of the fence penetrating into the tree. As the cutting disc 31 penetrates further into the tree, the fence 41 is pressed backwards against the action of the springs 49. When the cutting disc 31 has cut through the tree, the tree will be supported by the spikes 43 of the fence 41, but simultaneously the springs will move the root end of the tree with great force and high speed in the direction of movement of the feller-bundler, whereby, as a consequence due to the inertia of the rest of the tree, the tree falls backwards and down onto the load platform 51. The portions 71 and 73 of the side elements of the load platform provide the required guiding of the tree laterally. If needed, the rotateable arm 75 can be used for guiding a tree—which is difficult to get at or is inclined—to a proper direction towards the load platform and prevent that the tree falls forward in the direction of movement of the apparatus. It should be noted that by means of the end portions 71 and 73 of the load platform it is possible to affect the tree laterally to a certain extent by tilting the load platform in a suitable manner sideways by means of the hydraulic motors 57 and 59.

As soon as the load platform has been filled with cut trees, the bundle of trees is transferred to the ground in a suitable place by tilting the load platform to one side or the other by means of the hydraulic motors 57 and 59. The length and the location of the load platform is preferably selected so that the cut trees are entirely supported by the load platform and no parts of the cut trees will be dragged on the ground during the movement of the apparatus. This is essential since it allows the driver to work into a forest and then drive out again with a load without turning the vehicle. Prior art devices do not allow such a method, since the trees are dragged after the vehicle. This advantage is essential, e.g. when thinning in rows or corridors.

The load platform is suspended in such a manner that the driver can easily counteract the risk of tilting when moving on ground with severe side inclinations.

As shown in FIG. 1, the load platform is placed high up on the vehicle and so that the front end of the load platform is located over the driver's cab. Hereby the driver will have a free view in all directions during the operation.

From the foregoing description it will be noted that a feller-bundler according to the invention provides many advantages. In the first place it should be noted that the feller-bundler allows "flying" felling and bundling of trees, i.e. without the need of stopping the machine for each tree. Further, felling can be performed without the need of repeatedly changing the direction of the vehicle. A further advantage is that the cut trees will be supported entirely so that the vehicle can be driven in any desirable direction for the off transport of a load of felled trees. The feller-bundler is of a simple construction and can be operated easily as compared with prior art machines in this field.

The present invention is not restricted to the embodiment shown and described, since modifications and variations thereof can be performed in various manners within the scope of the invention.

What we claim is:

1. An apparatus for felling and bundling trees, said apparatus being mounted on a vehicle and being adapted to fell trees during the time that the vehicle is in actual movement over the ground, which comprises in combination:
   a. a motor driven cutter device,
   b. means for adjusting the height of said cutter device with respect to the ground,
   c. an elongated collecting trough for cut trees located rearwardly and above said cutter device,
   d. a tree engaging means positioned above said cutter device and which comprises
      1. a generally horizontally disposed member,
      2. one end of said member being yieldably mounted so that it will be moved backwardly by a tree during the time that the cutter device is cutting through a tree,
      3. the other end of said member having means for engaging the tree trunk and supporting it against downward movement after the tree has been severed,
   e. means for moving the tree engaging means forwardly with great force and high speed as soon as the cutter device has severed a tree, whereby when a tree had been severed by said cutter device said engaging means will apply sudden force against the lower end of the severed tree and cause it to topple backwardly into said elongated collecting trough.

2. An apparatus according to claim 1 wherein said means for moving the tree engaging means forwardly with great force and high speed comprises a spring that is placed under compression when said member is moved backwardly by a tree.

3. An apparatus according to claim 1 wherein the cutter device is supported by parallel arms pivotally mounted to the vehicle and adapted to maintain the cutter device in any desired position.

4. An apparatus according to claim 1 wherein the end portion of the elongated collecting trough that is nearest the cutter device is provided with a forwardly open U-shaped space for accomodating the tree during the cutting operation.

5. An apparatus according to claim 1 wherein said elongated collecting trough is mounted on the vehicle so as to be tiltable laterally by means of hydraulic cylinders.

6. An apparatus according to claim 1 which includes guiding means for preventing the cut tree from falling sideways and for guiding the tree to a proper position in the collecting trough.

7. An apparatus according to claim 6 characterized in that said guiding means comprises a rotatable arcuate arm which is adapted to be actuated by means of a motor, said arm extending from its axis of rotation forwards in the direction of movement of the apparatus and in its operative position partially enclosing the tree.

8. An apparatus according to claim 1 wherein said cutter device comprises a cutting disc.

* * * * *